Feb. 15, 1955　　　J. P. CARR　　　2,701,940
ADJUSTMENT MECHANISM FOR AGRICULTURAL FLAILING MACHINES
Filed May 29, 1951　　　　　　　　　　　4 Sheets-Sheet 1

INVENTOR
JAMES P. CARR
BY Hans G. Hoffmeister
ATTORNEY

Feb. 15, 1955 J. P. CARR 2,701,940
ADJUSTMENT MECHANISM FOR AGRICULTURAL FLAILING MACHINES
Filed May 29, 1951 4 Sheets-Sheet 2
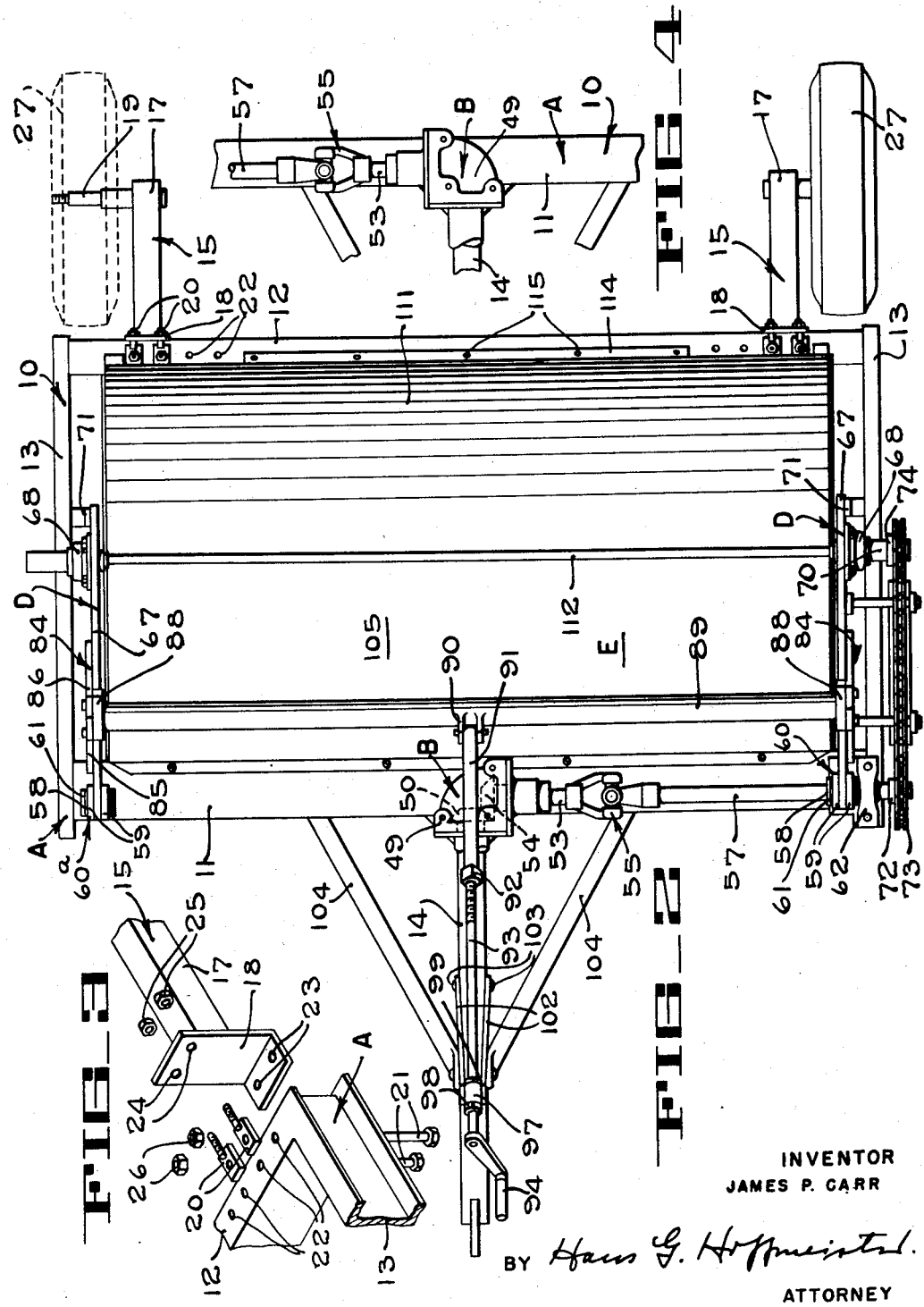
INVENTOR
JAMES P. CARR
BY Hans G. Hoffmeister
ATTORNEY

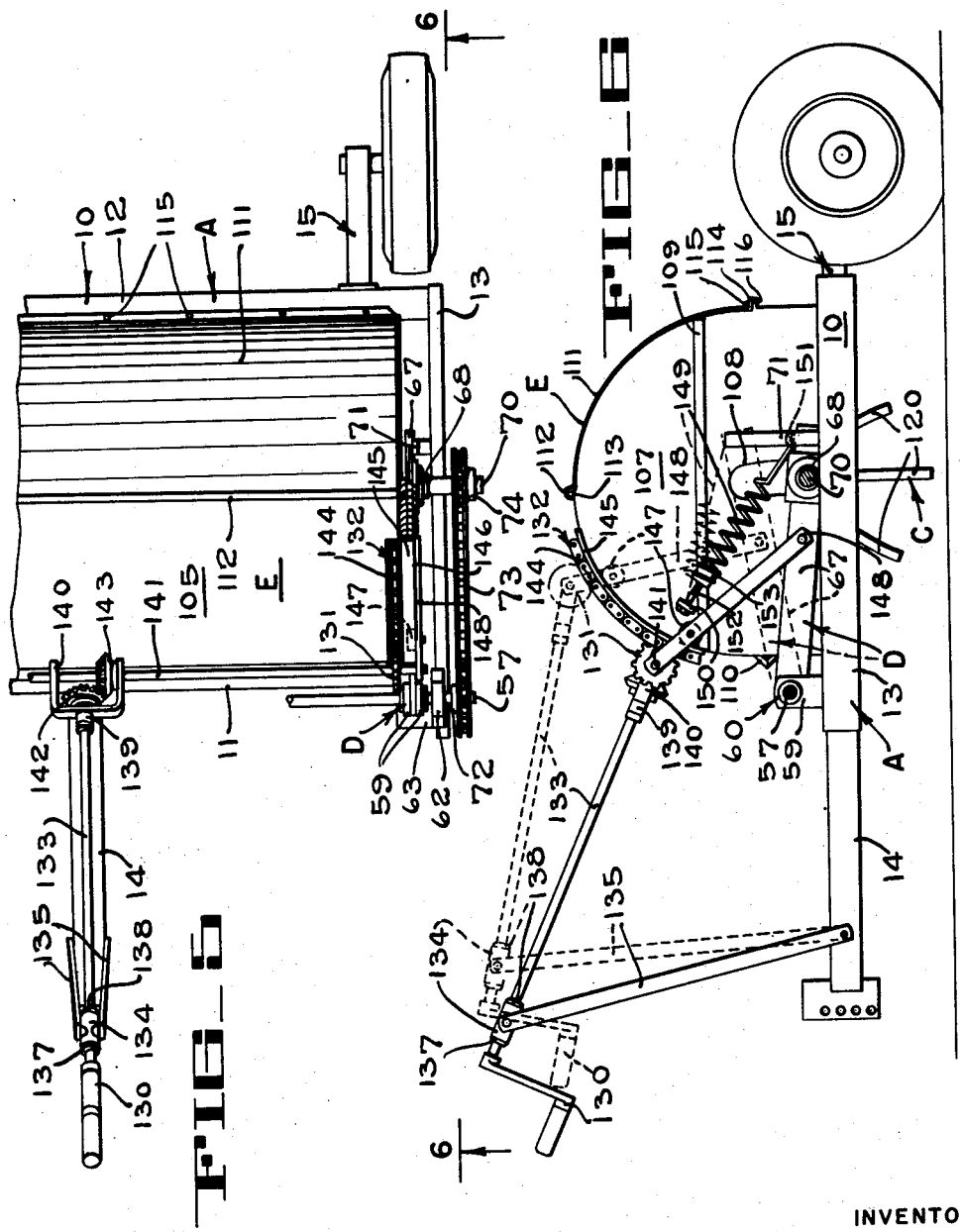

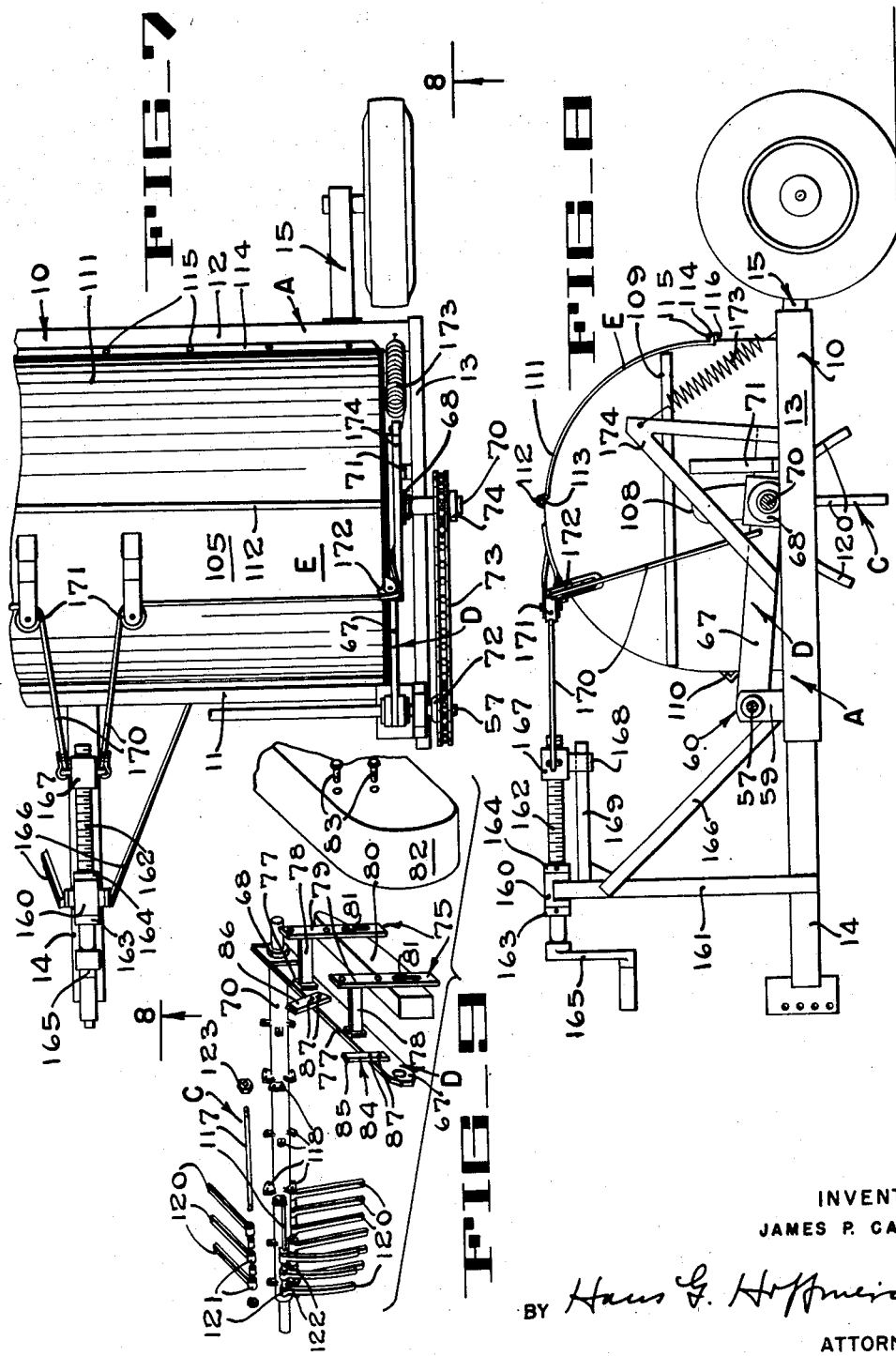

United States Patent Office 2,701,940
Patented Feb. 15, 1955

2,701,940

ADJUSTMENT MECHANISM FOR AGRICULTURAL FLAILING MACHINES

James P. Carr, Lansing, Mich., assignor to Food Machinery and Chemical Corporation, San Jose, Calif., a corporation of Delaware Application May 29, 1951, Serial No. 228,860

2 Claims. (Cl. 55—118)

The present invention appertains to an agricultural flailing machine, which is employed for flailing or beating into a mulch the foliage and stems of plants having their roots embedded in the ground. More particularly the present invention relates to a control mechanism for such machine.

An object of the invention is to provide improved mechanism for adjusting the height of the flail rotor of a plant-top flailing machine relatively to the ground.

Another object is to provide improved mechanism for accomplishing precise, rapid, and easy adjustment of the ground clearance of the flail rotor of a plant-top disintegrating machine while the machine is in operation.

These and other objects and advantages of the invention will be apparent from the following description and the accompanying drawings, in which:

Fig. 2 is a plan view in reduced scale of the machine shown in Fig. 1.

Fig. 3 is an enlarged fragmentary, exploded, perspective view showing the mounting arrangement for the chassis support wheels.

Fig. 4 is an enlarged fragmentary plan view showing the gear housing of Fig. 2 mounted in inverted position to reverse the direction of rotation of the flail rotor.

Fig. 5 is a fragmentary plan view of a modified form of the invention.

Fig. 6 is a section taken along line 6—6 of Fig. 5 showing the flail rotor and its associated control mechanism in lowered position in solid lines, and in elevated position in broken lines.

Fig. 7 is a fragmentary plan view of a further modified form of the invention.

Fig. 8 is a section taken along line 8—8 of Fig. 7.

Fig. 9 is a partly exploded perspective view of the flail rotor shaft, some of the flails being assembled thereon, and portions of associated parts being shown.

Figure 1:
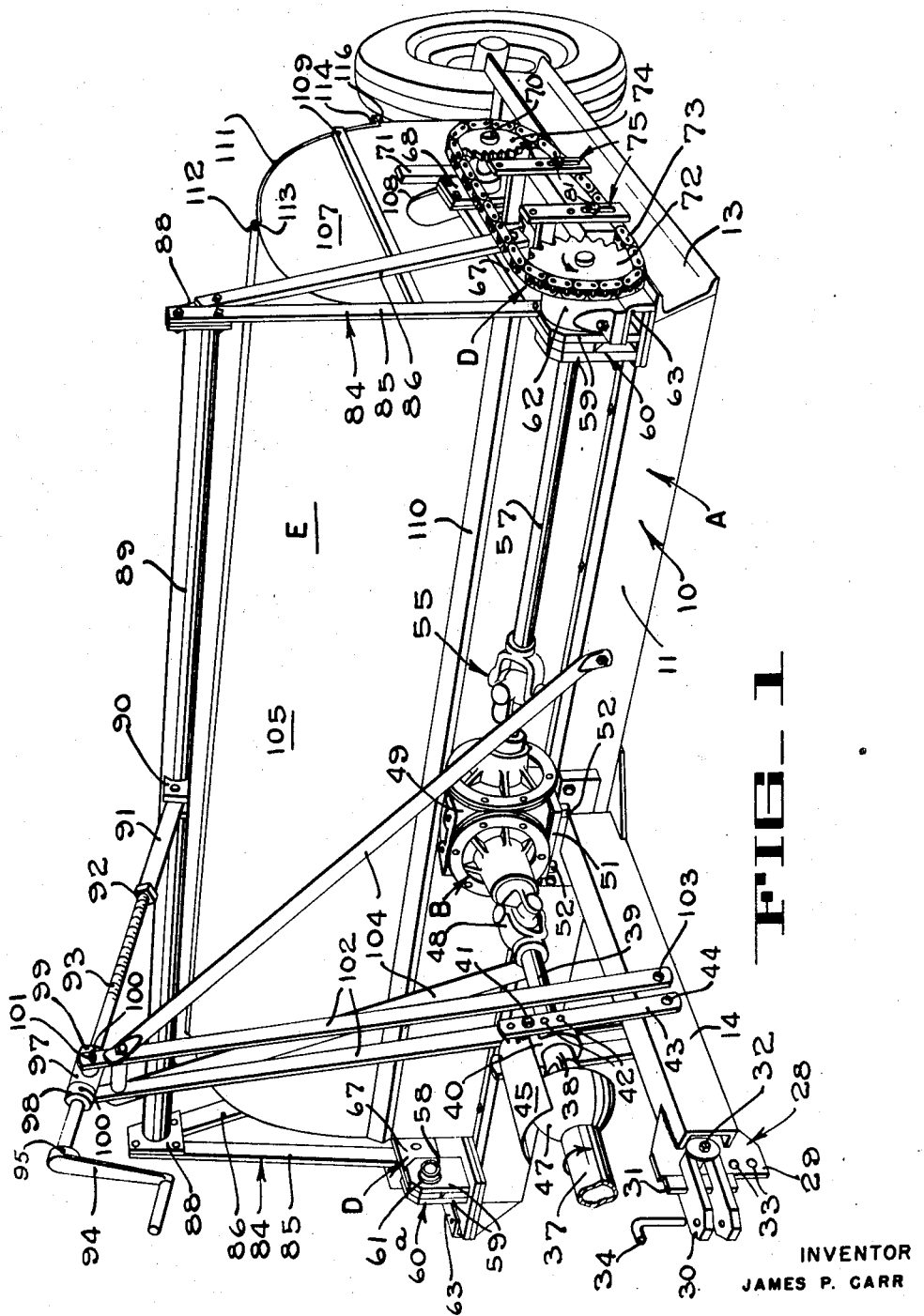
Fig. 1 is a perspective front view of a machine embodying one form of the invention, portions thereof being broken away.

In all views of the drawings the same type of machine is illustrated, which is essentially, a trailer type, power-driven rotary flail type beater for removing and shredding to bits the top growth of plants having their roots embedded in the ground. The machine (Figs. 1 and 2) comprises a trailer chassis A, with power transmission means B mounted thereon for driving a flail rotor C (Figs. 6, 8 and 9) from the power take-off of a suitable tractor, not shown, which is employed to pull the machine. The flail rotor C is journaled between the free ends of manually adjustable rotor support arm assemblies D, and is enclosed by a sheet metal housing E.

The trailer chassis A comprises a rectangular open frame 10 having front and rear channel members 11 and 12 connected together by longitudinally extending side channel members 13. A drawbar 14, of box-like configuration in cross section, is secured to extend forwardly from substantially the center of the front chassis frame member 11. Two wheel support members 15 (Figs. 2, 3, 5, 6, 7 and 8) are secured in laterally adjusted position to extend rearwardly from the rear chassis frame member 12.

Each wheel support member 15 comprises a body portion 17 of box-like configuration in cross section with an attaching bracket 18 (Fig. 3) on its forward end and a wheel supporting spindle 19 (Fig. 2) on its rear end. The attaching bracket 18 of each wheel support member 15 is secured to the rear chassis frame member 12 by eye bolts 20 and ordinary machine bolts 21.

The machine bolts 21 are inserted through the eyes of the eye bolts 20 and also through selected pairs of holes 22 (Figs. 2 and 3) of a plurality thereof in the rear chassis frame member 12. The bolts 21 also are inserted through holes 23 (Fig. 3) in the bottom of each attaching bracket 18. Nuts 26 are screwed onto the upper ends of the bolts 21 to clamp the parts firmly to the rear chassis frame member 12.

The eye bolts 20 are inserted through holes 24 in the upright portion of each of the attaching brackets 18, and nuts 25, screwed onto the eye bolts 20, clamp the attaching brackets 18 closely against the rear chassis frame member 12.

By removing the machine bolts 21 and eye bolts 20 and changing the location of the machine bolts 21 to other selected pairs of holes 22 in the rear chassis frame member 12, the tread width of a pair of automotive type rear supporting wheels 27, mounted on the laterally extending wheel spindles 19, may be adjusted to conform substantially to the width between rows of the crop to be worked over.

The forward end of the drawbar 14 is adapted to be connected to the usual drawbar connection of a tractor, not shown, by means of a hitch 28 comprising a vertical plate 29 welded in a notch provided therefor in the forward end of the drawbar. A clevis 30 (Fig. 1) is notched to receive the forward edge of the vertical plate 29 therein, a vertical bar 31 being welded in the forward portions of the clevis notches to bear against the forward edge of the vertical drawbar plate 29. A bolt 32 is inserted through the bight of the clevis 30, and also through a selected hole of a plurality 33 thereof in the vertical drawbar plate 29 to secure the clevis in vertically adjusted position to the plate 29. A clevis pin 34 is provided to secure the clevis 30 to the tractor drawbar connection. Thus, by inserting bolt 32 in a desired hole 33 in the plate 29, the height of the forward end of the drawbar 14 can be adjusted relatively to the tractor so as to position the chassis frame 10 substantially horizontally.

The power transmission mechanism B for driving the flail rotor C from the tractor engine (Figs. 1 to 2) comprises a torque tube 37 driven from the conventional power take-off, not shown, of the tractor used to tow the machine. The torque tube 37 is connected by a conventional front universal joint 38 to an intermediate drive shaft portion 39, which is journaled, just rearwardly of the front universal joint 38, in a vertically adjustable, pivoted bearing member 40.

The pivoted bearing member 40 provides adjustable support for the forward end of the intermediate drive shaft portion 39, and is pivotally supported at its upper end by cap screws 41, which are screwed into axially aligned, threaded holes provided therefor in the bearing member 40, and are inserted for pivotal support in a selected pair of holes 42 in two bearing support arms 43. The lower ends of the bearing support arms 43 are pivotally connected, by a bolt 44, to the drawbar 14. A sheet metal shield 45 is secured to the top of the pivoted bearing member 40, and extends forwardly to protect the front universal joint 38, which is further protected by a semi-spherical shield 47 mounted on the rear end of the torque tube 37.

The rear end of the intermediate drive shaft portion 39 is connected, by a conventional rear universal joint 48, to the forward end of a stub shaft, not shown, which is journaled in the forward end of a gear housing 49 and has a bevel gear 50 (Fig. 2) keyed to its rearward end within the gear housing. The gear housing 49 is mounted on a support plate 51, welded centrally to the front chassis frame member 11, and is secured thereto by cap screws 52 in either of two relatively inverted positions as shown in Figs. 2 and 4, respectively.

A stub shaft 53 (Fig. 2) is journaled to extend from a side of the gear housing 49 at right angles to the axis of the bevel gear 50, and a bevel gear 54, in mesh with the bevel gear 50, is keyed to the inner end of the stub shaft 53 within the gear housing. The outer end of the stub shaft 53 is connected, through a universal joint 55 (Figs. 1 and 2) to a transversely extending driven shaft 57.

With the gear housing mounted as shown in Figs. 1 and 2 the transversely extending shaft 57 extends toward the left hand side of the machine from the gear housing 49. When the gear housing is inverted, however, as shown in Fig. 4, the transverse shaft 57 extends toward the right hand side of the machine. The reason for thus making the gear housing capable of being mounted in either of two inverted positions is to provide means for reversing the direction of rotation of the flail rotor C, as will become apparent from an understanding of the remainder of the rotor drive mechanism to be described later herein.

With the gear housing 49 mounted as shown in Figs. 1 and 2, the transverse shaft portion 57 is inserted with a free rotative fit through an axial opening in a rotor arm support bushing 58 mounted in aligned openings in a pair of upright plates 59 which form part of a left hand rotor arm support bracket 60 mounted on the forward left hand corner of the chassis frame 10. A second similar bracket 60a is mounted on the right hand forward corner of the chassis frame 10. The bushings 58 are secured against axial displacement in their respective brackets by usual snap rings 61. A bearing 62 to provide journal support for the outer end of the driven transverse shaft 57 is mounted on an angular flange portion 63 on the outer side of the bracket 60 on the side of the machine toward which the transverse shaft 57 extends from the gear housing 49.

Each rotor arm support bushing 58 pivotally supports a rotor support arm 67, which extends rearwardly from the bushing 58 alongside the sheet metal rotor housing E. Each rotor support arm 67 has a rotor shaft bearing 68 (Figs. 1, 2 and 8) mounted on the outer side thereof a short distance from its rear end, and the ends of a flail rotor shaft 70 are journaled in these bearings. The rear end of each rotor support arm 67 rearwardly of the bearing 68 thereof rides along the upright inner side of a guide member 71, mounted on each chassis side frame member 13 to prevent lateral displacement of the rotor support arms.

A sprocket 72 is keyed to the driven transverse shaft 57 outwardly of the bearing 62, and a rotor drive chain 73 is trained around this sprocket, and also around a sprocket 74 keyed to the end of the flail rotor shaft 70 on the side of the machine toward which the transverse shaft 57 is directed. Two chain shield support brackets 75 (Figs. 1 and 9) are secured to the outer side of the rotor support arm 67 on the side of the machine from which the flail rotor shaft 70 is to be driven.

Each of these chain shield support brackets (Fig. 9) comprises a base portion 77, a laterally extending stem portion 78, and a vertical head portion 79 welded to the stem portion 78 to form a T. A chain rub block 80 of wood (Figs. 1, 2 and 9) is mounted by bolts 81 inserted in slotted holes in the brackets 75 to extend longitudinally between the lower ends of the vertically extending head portions 79 of the T-shaped brackets 75. The chain rub block 80 is secured in adjusted position closely adjacent the slack run of the rotor drive chain 73 to prevent whipping of the chain. A sheet metal chain shield 82 (Fig. 9) of conventional type is adapted to be secured by cap screws 83 to the heads 79 of the T-shaped brackets 75.

For adjusting the height of the flail rotor relatively to the ground over which the machine is drawn, an A-frame 84 (Figs. 1, 2 and 9) is provided on each rotor support arm 67, each A-frame comprising two upwardly converging side bars 85 and 86, secured, by cap screws 87 (Figs. 1 and 9), to each rotor support arm 67. The upper ends of each pair of converging bars 85 and 86 are connected together by a gusset plate 88, one of which is welded onto each end of a rigid, transversely extending member 89, which may be of steel tubing.

A yoke bracket 90 is welded to the forward side of the tubular member 89 substantially midway thereof, and the rear end of an actuating tube 91 is pivotally connected to the yoke bracket 90. A nut 92 is welded co-axially onto the forward end of the actuating tube 91, and into the nut 92 is screwed the threaded rear end of a rotor height adjusting rod 93.

A hand crank 94 is secured by a pin 95 to the forward end of the adjusting rod 93. The adjusting rod 93 is journaled in a trunnion sleeve 97, and is restrained against axial displacement therein by a pair of collars 98 and 99, secured by set screws 100 to the adjusting rod. Trunnion pins 101 extend laterally from each side of the trunnion sleeve 97 and are pivoted in openings provided therefor in the upper ends of a pair of fixed trunnion support standards 102. The lower ends of the standards 102 are secured, by cap screws 103, to opposite sides of the drawbar 14. A pair of diagonal braces 104 are connected from the upper ends of the trunnion support standards 102 to the front chassis frame member 11 to anchor the standards against forward and rearward displacement.

Turning the hand crank 94 to screw the adjusting rod 93 into or out of the nut 92 causes the actuating tube 91 and the rigid transverse connecting member 89 connected thereto to move forwardly or rearwardly as required to tilt the interconnected A-frames composed of the members 84 and 85, thereby to swing the rotor support arms 67 and the rotor shaft 70 journaled therein to desired adjusted position. Since such angular adjustment of the rotor support arms 67 and resultant vertical adjustment of the rotor shaft 70 is accomplished by a rotative movement of the arms 67 about the common axis of the rotor arm support bushings 58 and of the bearing 62 for the transverse drive shaft 57, such adjustment causes no change in the axial separation of the chain sprockets 72 and 74. Adjustment of the rotor height can, therefore, be made easily at any time, even when the machine is in operation.

The sheet metal rotor housing E is mounted, to enclose the flail rotor C and to permit vertical adjustment thereof. The housing E (Figs. 1 and 2) comprises a curved forward portion 105 of sheet metal, with a pair of end plates 107 fitted into the ends thereof. The lower edges of the end plates are notched at 108 to provide clearance for the rotor shaft during vertical adjustment of the rotor. A stiffening member 109 is secured transversely of each end plate 107. A stiffening angle member 110, which may be of sheet metal, also is provided along the curved forward side 105 of the rotor housing E.

The upper rearward portion of the rotor housing is removable in order to facilitate access to the flail rotor assembly. This removable portion of the rotor housing comprises a curved sheet metal panel 111 having a hooked upper edge portion 112 (Fig. 1) which is adapted to hook over an upstanding flange 113 on the upper edge of the forward sheet metal housing portion 105. The lower edge of the removable rear panel 111 is flanged outwardly as at 114 and is secured by cap screws 115 to the upper side of a channel member 116, the lower flange of which is mounted on the rear chassis frame member 12.

The flail rotor C (Fig. 9) comprises, in addition to the flail rotor shaft 70, a plurality of short flail support rods 117 inserted in aligned holes in a plurality of sets of ears 118 provided therefor throughout the portion of the rotor shaft 70 which lies within the rotor housing E. A plurality of flails 120 of molded rubber have hub portions 121 thereof threaded onto the short rods 117 to pivot freely thereon and held in axially separated position by spacing collars 122. The rods 117 are secured, by nuts 123 screwed onto their ends, against axial displacement in their supporting ears 118.

In the operation of the embodiment of the invention shown in Figs. 1, 2 and 9, the flail rotor C (Figs. 6 and 9) may be raised clear of the ground by manipulation of the hand crank 94, which is located within convenient reach of the operator, so as to turn the rotor adjusting rod 93 within the trunnion sleeve 97 as a bearing, thereby screwing the threaded rear end of the adjusting rod 93 into the nut 92 and drawing the actuating tube 91 forwardly to tilt the A-frames 84 forwardly about the common axis of the rotor arm support bushings 58 and the transverse shaft bearing 63.

This raises the rear ends of the rotor support arms 67 to elevate the flail rotor shaft 70 journaled in the bearings 68 thereon. Vertical adjustment of the flail rotor C does not affect the driving relation between the transversely extending driven shaft 57 and the flail rotor shaft 70, since, as explained previously herein, the pivotal axis of the rotor arms 67 is coincident with the rotative axis of the transverse driven shaft 57.

With the torque tube 37 turning in the direction of the arrow adjacent thereto in Fig. 1, and the gear housing 49 mounted in the position shown in Figs. 1 and 2, the transverse shaft 57 will extend toward the left hand side of the machine and will be driven to rotate in the direction of the arrow adjacent thereto in Fig. 1. With the transverse shaft 57 thus mounted and rotated the sprockets 72 and 74 and the drive chain 73 will drive the flail rotor C with its under side moving rearwardly.

To reverse the direction of rotation of the flail rotor C, the drive chain 73 is removed, the sprocket 74 is mounted on the other or right hand end of the flail rotor shaft 70, and the gear housing 49 is inverted to the position shown in Fig. 4. With the gear housing thus inverted the transverse shaft 57, which then will extend toward the right hand side of the machine, will be inserted through the right hand rotor arm support bushing 58. The bearing 62 for the transverse shaft 57 also, in this reversed position of the transverse shaft 57, will be mounted on the flange 63 of the right hand rotor arm bushing support bracket 60. The drive chain 73 then is trained around the sprocket 72 on the transverse shaft 57 and around the sprocket 74 on the right hand end of the flail rotor shaft 70, so that when the torque tube 37 is driven in the same direction as that indicated by the arrow in Fig. 1 the flail rotor C will be driven to rotate with its underside moving forwardly.

Since this latter mounting arrangement is merely the reverse of that shown in Figs. 1 and 2, it will be readily understood without further illustration. In this reversed position of the rotor drive mechanism, the additional parts associated therewith, including the T-shaped brackets 75, the wooden rub block 80 and the chain shield 82, also are mounted in their corresponding positions on the other or right hand side of the machine.

In the modified form of the invention shown in Figs. 5 and 6, the principal structural parts of the trailer chassis and flail rotor drive mechanism are the same as those described for the embodiment thereof illustrated in Figs. 1 and 2 and are designated by the same reference numerals. For adjusting the height of the flail rotor C relatively to the ground in the modified form of the invention shown in Figs. 5 and 6, a hand crank 130, generally similar to the hand crank 94 of the mechanism shown in Figs. 1 and 2, is arranged to drive a pair of sprocket wheels 131 up or down as required along a pair of curved racks 132 secured to the forward side and on opposite ends of the rotor housing E.

In order to provide driving connection between the hand crank 130 and the sprocket wheels 131, the hand crank is secured to the forward end of an adjusting rod 133 journaled in a trunnion sleeve 134 pivotally mounted between the upper ends of a pair of lever arms 135, the lower ends of which are pivotally mounted on the chassis drawbar 14. The adjusting rod 133 is retained against axial displacement in the trunnion sleeve 134 by collars 137 and 138 secured to the adjusting rod.

The rear end of the adjusting rod 133 is journaled in a bearing 139 mounted on the forward end of a yoke 140, the arms of which provide journal support for a transversely extending shaft 141. The sprocket wheels 131 are mounted one on each outer end of the transverse shaft 141 for rotation therewith. The transverse shaft 141 has driven connection with the adjusting rod 133 by means of a pair of meshed bevel gears 142 and 143 mounted on the adjusting shaft 133 and the transverse shaft 141, respectively.

Each of the curved racks 132 comprises a length of drive chain 144 mounted on a support plate 145 curved to conform to the front portion of the rotor housing E to which it is secured. The outer edge of each curved chain support plate 145 extends laterally beyond the side of the rotor housing E at 146 and is adapted to form a track for a roller 147 mounted one on the inner side of each of a pair of connecting links 148 which connect each end of the transverse shaft 141 to a rotor support arm 67.

A counterbalancing spring 149 is provided for each side of the machine, each spring being connected in tension between a bracket 150 secured to a side of the rotor housing E and to an eye 151 secured to the rotor support arm 67 near its free rear end. Adjustable connection of the upper end of the counter-balancing spring 149 to the bracket 150 is accomplished by means of a headed rod 152, inserted through an opening in the bracket 150, and the threaded shank of which is screwed into a fitting 153 secured in the upper end of each spring 149. By screwing the rod 152 into or out of the fitting 153 tension on the spring 149 can be adjusted as required.

In the further modification of the invention shown in Figs. 7 and 8, a bearing sleeve 160 is welded to the upper end of an upright standard 161, the lower end of which is secured to the drawbar 14. Diagonal braces 166 extend between the upper end of the standard 161 and the chassis frame 10 to secure the standard against thrust stresses of an adjusting rod 162 journaled in the bearing sleeve 160. Collars 163 and 164 retain the adjusting rod 162 against axial displacement in the bearing sleeve 160.

A hand crank 165 is secured to the forward end of the adjusting rod 162, the rear end of which is threaded and is screwed into an internally threaded sliding nut or connecting member 167. The connecting member 167 is retained against turning by an integrally connected downward extension 168 adapted to ride on a guide bar 169 welded to extend rearwardly from the standard 161.

Rotor arm elevating cables 170 are connected to the sliding nut 167 and to each of the rotor arms 67, each of said cables being passed around pulleys 171 and 172 mounted on the rotor housing E to guide them laterally and then downwardly over the edge of the rotor housing. Rotation of the hand crank 165 moves the sliding nut 167 axially along the adjusting rod 162 to control the height of the flail rotor C mounted on the support arms 67.

One end of a coil spring 173 is connected to the upper end of an A-frame 174 secured to the rear or free end of each rotor support arm 67 while the other end of spring 173 is connected to the rearward portion of the chassis frame 10 to urge the rotor support arms against upward displacement which might produce slack in the adjusting cables 170 when a wheel of the machine passes over a bump.

While I have illustrated and described a preferred embodiment of the invention, and some modifications thereof, it will be understood, however, that various changes and modifications may be made in the details thereof without departing from the spirit and scope of the invention as set forth in the appended claims.

Having thus described the invention, what I claim as new, and desire to protect by Letters Patent, is as follows:

1. In an agricultural flailing machine, the combination of a rigid frame having means for supporting the same in spaced relation to the ground surface, a support arm pivotally mounted on each side of said frame, a flail rotor assembly journaled between the free ends of said support arms, a rigid lifter arm secured in upstanding position on each support arm at a point spaced outwardly from the pivotal connection of the latter to said frame, a bar secured to and extending between the upper ends of said lifter arms, an internally threaded sleeve secured to and projecting from said bar intermediate its ends, a thrust resisting rod member journaled for rotative and swinging movement on said frame and having an end thereof in threaded engagement with the interior of said sleeve, means for preventing translatory movement of said rod member relative to said frame, and means for rotating said rod member to axially move said sleeve relative thereto, thereby effecting a vertical adjustment of said flail rotor assembly on said frame by swinging movement of said lifter arms and said support arms as a unit on their aforesaid pivotal connections to said frame.

2. In an agricultural flailing machine, a frame structure, a support arm pivotally mounted on each side of said structure, a flail rotor assembly journaled between the free ends of said support arms, an A-frame actuating member secured to each support arm and extending upwardly therefrom, one leg of each actuating member being secured to its associated support arm adjacent the pivotal axis of the latter and the other leg being secured to and adjacent the freely movable end of the support arm, a connecting bar secured to and extending between the apices of said A-frame actuating members, an interiorly threaded sleeve secured to said bar intermediate its ends, a support post secured in stationary position on said frame structure and projecting upwardly therefrom, a thrust-resisting rod member journaled for rotative and swinging movement in said support post and having an end portion threadedly engaging the interior of said sleeve, means for preventing translatory movement of said rod member relative to said support post, and means for rotating said rod member to axially move said sleeve relative thereto to swing said actuating members and said support arms as a unit on said pivotal mountings to adjust the vertical position of said flail rotor assembly relative to said frame structure.

References Cited in the file of this patent

UNITED STATES PATENTS

| | | |
|---|---|---|
| 1,035,056 | Shubert et al. | Aug. 6, 1912 |
| 1,043,507 | Coldwell | Nov. 5, 1912 |
| 1,263,965 | Twitchel | Apr. 23, 1918 |
| 2,465,488 | Sears et al. | Mar. 29, 1949 |
| 2,556,446 | Roach | June 12, 1951 |